United States Patent
Sekiya et al.

(10) Patent No.: US 6,972,784 B1
(45) Date of Patent: Dec. 6, 2005

(54) RECORDING CONTROL APPARATUS AND RECORDING CONTROL METHOD

(75) Inventors: Toshiyuki Sekiya, Mishima (JP); Mitsuo Shiraishi, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 09/666,271

(22) Filed: Sep. 20, 2000

(30) Foreign Application Priority Data

Sep. 20, 1999 (JP) .................................. 11-265518

(51) Int. Cl.⁷ ........................................... B41J 2/435
(52) U.S. Cl. ...................................... 347/237; 347/247
(58) Field of Search ................ 347/130, 131, 347/132, 133, 144, 236–238, 239, 246–247, 347/252, 255, 240, 251; 358/1.9; 710/54–56, 710/58; 719/314

(56) References Cited

U.S. PATENT DOCUMENTS

| | | | | |
|---|---|---|---|---|
| 4,596,995 A | * | 6/1986 | Yamakawa et al. | 347/237 |
| 5,177,405 A | | 1/1993 | Kusuda et al. | 315/169.1 |
| 5,255,013 A | * | 10/1993 | Ng et al. | 347/240 |
| 5,451,977 A | | 9/1995 | Kusuda et al. | 345/44 |
| 5,581,295 A | * | 12/1996 | Prowak | 347/237 |
| 5,687,002 A | * | 11/1997 | Itoh | 347/133 |
| 6,052,141 A | * | 4/2000 | Takeuchi | 347/246 |
| 6,133,984 A | * | 10/2000 | Deguchi et al. | 355/40 |
| 6,452,696 B1 | * | 9/2002 | Bogart et al. | 358/1.9 |

FOREIGN PATENT DOCUMENTS

| | | | |
|---|---|---|---|
| JP | 1-238962 | 9/1989 | B41J 3/21 |
| JP | 2-208067 | 8/1990 | B41J 2/45 |
| JP | 2-212170 | 8/1990 | B41J 2/45 |
| JP | 3-20457 | 1/1991 | C23C 14/08 |
| JP | 3-194978 | 8/1991 | H01L 33/00 |
| JP | 4-5872 | 1/1992 | H01L 33/00 |
| JP | 4-23367 | 1/1992 | H01L 33/00 |
| JP | 4-29659 | 10/1992 | B41J 2/44 |
| JP | 5-84971 | 4/1993 | B41J 2/44 |

* cited by examiner

Primary Examiner—Hai Pham
(74) Attorney, Agent, or Firm—Fitzpatrick, Cella, Harper & Scinto

(57) ABSTRACT

Light quantity unevenness is corrected at high resolution to improve image quality, without increasing a speed of system clock. Pixel correction data which is to correct a light emission characteristic of each light emission element by the pixel unit is prepared for plural lines, and the pixel correction data for the plural lines are periodically changed to modify a light emission driving time of each light emission element.

6 Claims, 18 Drawing Sheets

FIG. 9

| IDEAL COUNT VALUE SUMMATION OF TWO QUEUES | 2n ACTUAL COUNT VALUE | 2n+1 ACTUAL COUNT VALUE | 2n CORRECTION VALUE | 2n+1 CORRECTION VALUE | ACTUAL COUNT VALUE SUMMATION OF TWO QUEUES | CORRECTION VALUE AVERAGE OF TWO QUEUES | LIGHT QUANTITY RESIDUAL ERROR RATIO |
|---|---|---|---|---|---|---|---|
| 60.34579924 | 30 | 30 | -2 | -2 | 60 | -2 | -0.57303 |
| 60.6284033 | 30 | 31 | -2 | -1 | 61 | -1.5 | 0.612909 |
| 60.92772837 | 30 | 31 | -2 | -1 | 61 | -1.5 | 0.118619 |
| 61.24210197 | 31 | 30 | -1 | -2 | 61 | -1.5 | -0.39532 |
| 61.56927327 | 31 | 31 | -1 | -1 | 62 | -1 | 0.699581 |
| 61.90649968 | 31 | 31 | -1 | -1 | 62 | -1 | 0.151035 |
| 62.25065216 | 31 | 31 | -1 | -1 | 62 | -1 | -0.40265 |
| 62.59833552 | 31 | 32 | -1 | 0 | 63 | -0.5 | 0.641654 |
| 62.94601888 | 31 | 32 | -1 | 0 | 63 | -0.5 | 0.085758 |
| 63.29017137 | 32 | 31 | 0 | -1 | 63 | -0.5 | -0.45848 |
| 63.62739777 | 32 | 32 | 0 | 0 | 64 | 0 | 0.5856 |
| 63.95456908 | 32 | 32 | 0 | 0 | 64 | 0 | 0.071036 |
| 64.04467636 | 32 | 32 | 0 | 0 | 64 | 0 | -0.06976 |
| 64.11973512 | 32 | 32 | 0 | 0 | 64 | 0 | -0.18674 |
| 64.17807286 | 32 | 32 | 0 | 0 | 64 | 0 | -0.27747 |
| 64.21865966 | 32 | 32 | 0 | 0 | 64 | 0 | -0.34049 |
| 64.24114776 | 32 | 32 | 0 | 0 | 64 | 0 | -0.37538 |
| 64.24588492 | 32 | 32 | 0 | 0 | 64 | 0 | -0.38272 |
| 64.23390106 | 32 | 32 | 0 | 0 | 64 | 0 | -0.36414 |
| .... | .... | .... | .... | .... | .... | .... | .... |

| BIT NO. | LIGHT QUANTITY (µW) | IDEAL COUNT VALUE | ACTUAL COUNT VALUE | CORRECTION VALUE | LIGHT QUANTITY RESIDUAL ERROR RATIO |
|---|---|---|---|---|---|
| 1 | 89.6936586 | 30.1729 | 30 | -2 | -0.57303 |
| 2 | 90.113701 | 30.3142 | 30 | -2 | -1.036483 |
| 3 | 90.5585963 | 30.46386 | 30 | -2 | -1.52267 |
| 4 | 91.0258586 | 30.62105 | 31 | -1 | 1.2375441 |
| 5 | 91.5121425 | 30.78464 | 31 | -1 | 0.6995807 |
| 6 | 92.0133716 | 30.95325 | 31 | -1 | 0.1510347 |
| 7 | 92.5248951 | 31.12533 | 31 | -1 | -0.40265 |
| 8 | 93.0416667 | 31.29917 | 31 | -1 | -0.955833 |
| 9 | 93.5584382 | 31.47301 | 31 | -1 | -1.502905 |
| 10 | 94.0699617 | 31.64509 | 32 | 0 | 1.1215464 |
| 11 | 94.5711908 | 31.8137 | 32 | 0 | 0.5856003 |
| 12 | 95.0574747 | 31.97728 | 32 | 0 | 0.0710362 |
| 13 | 95.1914037 | 32.02234 | 32 | 0 | -0.069758 |
| 14 | 95.3029657 | 32.05987 | 32 | 0 | -0.186737 |
| 15 | 95.3896747 | 32.08904 | 32 | 0 | -0.277467 |
| 16 | 95.45 | 32.10933 | 32 | 0 | -0.340492 |
| 17 | 95.4834247 | 32.12057 | 32 | 0 | -0.375379 |
| 18 | 95.4904657 | 32.12294 | 32 | 0 | -0.382725 |
| 19 | 95.4726537 | 32.11695 | 32 | 0 | -0.36414 |
| .... | .... | .... | .... | .... | .... |

600

RECORDING CONTROL APPARATUS AND RECORDING CONTROL METHOD

BACKGROUND OF THE INVENTION

1. Field of the Invention

The present invention relates to a recording control apparatus which performs recording on a recording medium by using a recording element array in which plural recording elements are formed in line, and a recording control method which controls an operation of the recording control apparatus.

2. Related Background Art

Conventionally, as a recording apparatus which forms an image on a recording medium by using a recording head, for example, there is an apparatus which forms a latent image and performs recording on a photosensitive body in an electrophotographic method by using an LED (light emitting diode) array as the recording head.

As this LED array, there is a self-scanning type LED array (called an SLED hereinafter). This SLED array has been introduced in Japanese Patent Application Laid-Open Nos. 1-238962, 2-208067, 2-212170, 3-20457, 3-194978, 4-5872, 4-23367, 4-296579 and 5-84971, Japan Hard-copy Memoir 1991 (A-17) "Proposal of Light Emission Element Array for Light Printer in Which Driving Circuits Have Been Integrated", IEICE (Institute of Electronics, Information and Communication Engineers) Memoir (Mar. 5, 1990) "Proposal of SLED Using PNPN Thyristor Structure", and the like, and has been paid to attention as a recording light emission element for recording.

FIG. 13 shows an example of the SLED array, and FIG. 14 shows timing of various signals for driving and controlling the SLED array. Hereinafter, an example of the case where all elements are lit will be explained.

In FIG. 13, symbol VGA denotes a power supply voltage of the SLED array. The voltage VGA is applied through resistors r to diodes D which are cascaded to a terminal of a start pulse φS.

The SLED array is composed of transfer thyristors (i.e., thyristors used for data transfer) D1' to D5' arranged in array and light emission thyristors (i.e., thyristors used for light emission) D1 to D5 arranged in array. The gates of the transfer and light emission thyristors are connected to each other. Namely, the gate of the first thyristor is connected to the input part of the signal (start pulse) φS, the gate of the second thyristor is connected to the cathode of the diode D connected to the terminal of the signal φS, and the gate of the third thyristor is connected to the cathode of a next diode.

Hereinafter, data transfer and light emission will be explained according to the timing chart shown in FIG. 14.

The data transfer is started by changing the level of the signal φS from 0V to 5V. When the level of the signal φS reaches 5V, a voltage Va=5V, a voltage Vb= 3.7V (it is assumed that forward voltage drop of the diode is 1.3V), a voltage Vc=2.4V, a voltage Vd= 1.1V, and a voltage Ve and following=0V. Further, the level of the gate signal of the transfer thyristor D1' is changed from 0V to 5V, and the level of the gate signal of the transfer thyristor D2' is changed from 0V to 3.7V.

In this state, by changing the level of a signal φ1 from 5V to 0V, potentials of the anode, cathode and gate of the transfer thyristor D1' become 5V, 0V and 3.7V respectively, thereby satisfying an on condition of the thyristor. When the transfer thyristor D1' is turned on, this thyristor D1' is still in the on state even if the level of the signal φS is changed to 0V, thereby maintaining the voltage Va≅5V. This is because the signal φS is supplied through a resistor (not shown), and a potential between the anode and gate of the thyristor becomes substantially identical when the thyristor is turned on. Thus, even if the level of the signal φS is changed to 0V, the on condition of the first thyristor is maintained, and a first shift operation ends.

In this state, when the level of a signal φI for the light emission thyristor is changed from 5V to 0V, the condition same as the condition that the transfer thyristor is in the on condition is satisfied, whereby the light emission thyristor D1 is turned on, and a first LED is lit. In the first LED, when the level of the signal φI is returned to 5V, a potential difference between the anode and cathode of the light emission thyristor becomes zero, and thus a minimum holding current of the thyristor can not be flowed, whereby the light emission thyristor D1 is turned off.

Next, a transfer condition from the transfer thyristor D1' to the transfer thyristor D2' will be explained.

Since the level of the signal φ1 is maintained to 0V even if the light emission thyristor D1 is turned off, the transfer thyristor D1' is still on, and the gate voltage of the transfer thyristor D1' satisfies Va≅5V and Vb=3.7V. In this state, by changing the level of a signal φ2 from 5V to 0V, potentials of the transfer thyristor D2' become 5V at the anode, 0V at the cathode and 3.7V at the gate, whereby the transfer thyristor D2' is turned on.

After the transfer thyristor D2' has been turned on, when the level of the signal φ1 is changed from 0V to 5V, the transfer thyristor D1' is turned off as well as the light emission thyristor D1 being turned off. Thus, the on condition of the transfer thyristor is shifted from the thyristor D1' to the thyristor D2'. Then, when the level of the signal φI is changed from 5V to 0V, the light emission thyristor D2 is turned on, and the LED is lit.

The reason why only the light emission thyristor corresponding to the transfer thyristor being on can emit the light is as follows. Namely, when the transfer thyristor is not on, since the gate voltages of the thyristors except for the thyristor adjacent to the thyristor being on are 0V, the on condition of the thyristor is not satisfied. With respect to the adjacent thyristor, when the light emission thyristor is turned on, the potential level of the signal φI becomes 3.4V (corresponding to forward voltage drop of the light emission thyristor). Thus, since a potential difference between the gate and cathode of the adjacent thyristor is zero, this thyristor can not be turned on.

It was explained that the light emission thyristor is turned on by shifting the level of the signal φI to 0V, whereby the LED is lit. In a practical printing operation, it is of course necessary to control whether or not the LED is to be actually lit at such timing, in accordance with image data. In FIG. 14, image data φD represents such control. Namely, the logical sum of the signal φI and the image data is obtained externally. Only when the image data is 0V, a φI terminal of the SLED array actually becomes 0V, whereby the light is emitted. When the image data is 5V, the φI terminal of the SLED array is maintained to 5V, whereby the light is not emitted.

Each of the chips (SLED chips) which constitutes the SLED array contains, e.g., 128 light emission thyristors which are selectively and sequentially lighting-controlled by the transfer thyristors.

FIG. 15 shows an equivalent circuit at the time when the light emission thyristor (light emission element) is driven.

A driving current is obtained by subtracting the forward voltage drop of the light emission diode of the light emission thyristor from a power supply voltage, and then dividing the obtained voltage by the sum of external current limitation resistance and thyristor internal resistance.

Therefore, even in one SLED chip, when a forward voltage drop quantity and the internal resistance of each light emission element disperse or vary, the driving current thus varies. However, the dispersion of the forward voltage drop quantity and the internal resistance in the light emission elements of one SLED chip is generally lower than the dispersion of the forward voltage drop quantity average value and the internal resistance average value in the SLED chips. States of the dispersion are shown in FIGS. 16 and 17.

FIG. 16 shows a driving current of each pixel in a case where the identical current limitation resistance Ra [Ω] is given to all outputs of drivers for the signals φI of the plural SLED chips. In FIG. 16, the X-axis represents arrangement of the respective light emission pixels of each chip, and the Y-axis represents the driving currents corresponding thereto.

FIG. 17 shows relation between the reciprocal of the current limitation resistance of each light emission element in each SLED chip and the driving current.

On the other hand, a relation between the driving current and a light emission quantity of the SLED chip is similar. Namely, the dispersion in pixels of one SLED chip is generally lower than the dispersion of the average value in the SLED chips. States of the dispersion are shown in FIGS. 18 and 19.

FIG. 18 shows the light emission quantity of each light emission element in a case where the signals φI of the plural SLED chips are driven by an ideal constant current circuit (current value Ia). In FIG. 18, the X-axis represents arrangement of the respective light emission pixels of each chip, and the Y-axis represents the light emission quantity corresponding thereto.

FIG. 19 shows relation between the driving current and the light emission quantity of each light emission elements in each SLED chip.

Thus, in each SLED chip provided on one LED head, according to the relation between the average driving current and the average light quantity and the relation between the average driving current and the external resistance, the average driving current from which a predetermined target average light quantity L can be obtained is first calculated, the external resistance from which this average driving current can be obtained is then calculated, and a resistor having the most-approximated resistance is selected from among commercially available resistors of which nominal resistances are based on 24 series, 96 series and the like, and the selected resistor is installed.

Thus, the LED head in which the difference of the average light quantities in the SLED chips can be controlled within a predetermined range is made. Such states are shown in FIGS. 20 and 21.

As above, the average light quantities of the respective SLED chips are accurately equalized with others, whereby substantially uniform exposure is performed on the entire head.

However, in the SLED chips, there is a case where in-chip light emission unevenness (i.e., light quantity unevenness) common to the entire chips occurs due to various physical characteristic distributions which are originated from an internal wiring impedance, physical unbalance of thermal resistance, and problems on a semiconductor manufacturing process such as etching or the like.

For such the in-chip light quantity unevenness, light quantity correction is performed to appropriately modify a light emission time of one pixel according to a light emission characteristic (light quantity unevenness) of each light emission element and thus secure uniform exposure.

Hereinafter, as an example of conventional light quantity correction, the light quantity correction for the in-line light emission unevenness common to the SLED chips will be explained with reference to FIGS. 22, 23A, 23B and 24.

FIG. 22 shows an example that the respective SLED chips can independently perform simultaneous scanning.

In FIG. 22, numeral 301 denotes a 56-bit memory which stores image data of 56 SLED chips 200. In each SLED chip 200, since a first-pixel light emission point to a 128th-pixel light emission point are sequentially selected and operated, the 56-bit memory 301 latches the image data of the 56 chips every time.

Numeral 302 denotes a gate circuit of which input side is connected to the 56-bit memory 301 and output side is connected to the SLED chip.

The image data of the 56 chips (56-bit data in case of binary driving) is input to the gate circuit 302, and the input image data and the driving timing signal φI are subjected to an AND operation. Then, the driving signal φI is output only to the driving output of the chip of which image data is on.

On the other hand, the driving output of the chip of which image data is off remains being fixed in the level not emitting light (i.e., H (high) level in case of the SLED chip).

Since each SLED chip 200 contains 128 light emission elements, the above operation is repeated from the first pixel to the 128th pixel sequentially. Incidentally, as described above, the selection and the scanning to the light emission pixels of all the chips are directly controlled responsive to the signals φS, φ1 and φ2 in common.

A driving time of each light emission element is determined by the signal φI common to the 56 chips. If it is assumed that the signals φS, φ1 and φ2 are timing common to all the chips, first bit to 128th bit are scanned for all the chips simultaneously.

Therefore, by modifying the length of a term L of the signal φI being the light emission term of each light emission element, tendentious light emission unevenness for the first to 128th bits in the chip is corrected.

FIG. 23A shows the correction data for each light emission element, and the light emission time of each light emission element which is calculated based on the correction data. FIG. 23B shows a driving waveform for each light emission element, which is controlled based on the calculated light emission time.

FIG. 24 shows a conventional control system 350 which generates the correction light emission control signal φI to drive and control each light emission element.

In the control system 350 of FIG. 24, a pixel number designation counter 351 which designates a pixel number outputs the pixel number to a correction memory 352. In each scanning line, every time light emission points from 0 to 127 are shifted, the pixel number designation counter 351 counts up the number of shifted light emission points. When no light emission point is shifted (i.e., the counted value is "0"), a correction value K (=+3) is read from the correction memory 352.

The correction value K read from the correction memory 352 is subtracted from a light emission time standard value S being the output value of a light emission time standard value setting register 353, by a subtracter 354. Here, since the light emission time standard value S is 32, when the correction value K is 3, S−K=32−3=29 is given.

On the other hand, every time the light emission point is shifted, a six-bit counter 355 for generating a light emission driving signal counts up the number of shifted light emission points from zero. The six-bit counter 355 receives a basic clock of the control system for an image formation apparatus, from a clock input in an array head or an oscillator (not shown) provided in the array head. Thus, it is logically designed that one-time light emission point shifting is performed while the six-bit counter 355 performs one-cycle counting (64 counting).

The counted values of the six-bit counter 355 are sequentially compared with counter load values (=the light emission time standard value S−the correction value K) after subtraction by a comparator 356. By such comparison, when the former≧ the latter, e.g., only while S−K≧29, the light emission control signal φI has a low level (=L), and such the light emission driving as shown in FIG. 23B is performed. Hereinafter, the light emission time correction for the second and following light emission elements are similarly performed according to the correction value K.

However, when such light emission duty correction for each light emission timing is performed, minimum correction resolution is determined by a system clock of a light emission duty correction circuit.

For example, in an output waveform as shown in FIG. 25, when a one light emission repetition period is 1.1 μs and an actual light emission term (φI=L) in this period is 700 ns or so, if the system clock being the base clock of the control system shown in FIG. 24 is 45 MHz, modifying resolution in the light emission term is 22 ns. Thus, a light emission quantity change of 3% (=22/700) or so in one correction unit occurs.

By such the resolution of light quantity correction, it is impossible to perform sufficiently satisfactory correction according to an image formation condition.

SUMMARY OF THE INVENTION

An object of the present invention is to solve the above-described problem.

Another object of the present invention is to compensate a recording characteristic error of a recording element with high accuracy.

In order to achieve the above object, the present invention is characterized by a recording control apparatus which performs recording on a recording medium by using a recording head, the apparatus comprising:

the recording head which includes at least one recording element array in which plural recording elements are aligned along a predetermined direction;

a driving correction table which includes pixel correction data for correcting a recording driving characteristic of each recording element constituting the recording element array by the pixel unit of image data, and in which the pixel correction data is provided corresponding to plural lines of the image data; and driving control means which modifies a recording driving time of each recording element of the recording element array by the pixel unit, on the basis of the driving correction table including the pixel correction data of the plural lines.

Further, the present invention is characterized by a recording control apparatus which performs electrophotographic recording by using a recording head arranged in a main scan direction perpendicular to a movement direction of a recording medium, the recording control apparatus comprising:

the recording head which includes at least one recording element array in which plural recording elements are aligned along the main scan direction;

a light quantity correction table which includes pixel correction data for correcting a light emission characteristic of each recording element constituting the recording element array by the pixel unit of image data, and in which the pixel correction data is provided corresponding to plural lines of the image data; and driving control means which modifies a light emission driving time of each recording element of the recording element array by the pixel unit, on the basis of the light quantity correction table including the pixel correction data of the plural lines.

Further, the present invention is characterized by a recording control method which performs recording on a recording medium by using a recording head, the recording head including at least one recording element array in which plural recording elements are aligned along a predetermined direction, the method comprising:

a step of generating a driving correction table which includes pixel correction data for correcting a recording driving characteristic of each recording element constituting the recording element array by the pixel unit of image data, and in which the pixel correction data is provided corresponding to plural lines of the image data; and a driving control step of modifying a recording driving time of each recording element of the recording element array by the pixel unit, on the basis of the driving correction table including the pixel correction data of the plural lines.

Further, the present invention is characterized by a recording control method which performs electrophotographic recording on a recording medium moving in a direction perpendicular to a main scan direction, by using a recording head which includes at least one recording element array in which plural recording elements are aligned along the main scan direction, the recording control method comprising:

a step of generating a light quantity correction table which includes pixel correction data for correcting a light emission characteristic of each recording element constituting the recording element array by the pixel unit of image data, and in which the pixel correction data is provided corresponding to plural lines of the image data; and a driving control step of modifying a light emission driving time of each recording element of the recording element array by the pixel unit, on the basis of the light quantity correction table including the pixel correction data of the plural lines.

Further, the present invention is characterized by a medium which stores a control program to cause a computer to perform recording control for a recording medium, by using a recording head which includes at least one recording element array in which plural recording elements are aligned along a predetermined direction, the control program causing the computer to generate a driving correction table which includes pixel correction data for correcting a recording driving characteristic of each recording element constituting the recording element array by the pixel unit of image data, and in which the pixel correction data is provided corresponding to plural lines of the image data, and to modify a recording driving time of each recording element of the recording element array by the pixel unit, on the basis of the driving correction table including the pixel correction data of the plural lines.

Further, the present invention is characterized by a medium which stores a control program to cause a computer to perform electrophotographic recording control for a recording medium moving in a direction perpendicular to a main scan direction, by using a recording head which includes at least one recording element array in which plural recording elements are aligned along the main scan direction, the control program causing the computer
to generate a light quantity correction table which includes pixel correction data for correcting a light emission characteristic of each recording element constituting the recording element array by the pixel unit of image data, and in which the pixel correction data is provided corresponding to plural lines of the image data, and
to modify a light emission driving time of each recording element of the recording element array by the pixel unit, on the basis of the light quantity correction table including the pixel correction data of the plural lines.

Further, the present invention is characterized by a recording control apparatus for controlling a recording element array, comprising:

driving means for driving each of recording elements in the recording element array on the basis of correction data for compensating a recording characteristic error of the recording element; and control means for periodically changing the correction data used by the driving means for one recording element.

Further, the present invention is characterized by a recording control method for recording an image by using a recording element array, the method comprising:

a driving step of driving each of recording elements in the recording element array on the basis of correction data for compensating a recording characteristic error of the recording element; and a control step of periodically changing the correction data used in the driving step for one recording element.

Other objects and features of the present invention will become apparent from the following detailed description and the attached drawings.

BRIEF DESCRIPTION OF THE DRAWINGS

FIG. 9 is a diagram for explaining a correction table according to the present invention;

FIG. 11 is a diagram for explaining a conventional correction table;

DETAILED DESCRIPTION OF THE PREFERRED EMBODIMENTS

[Outline]

First, an outline of the present invention will be explained.

Figure 6:
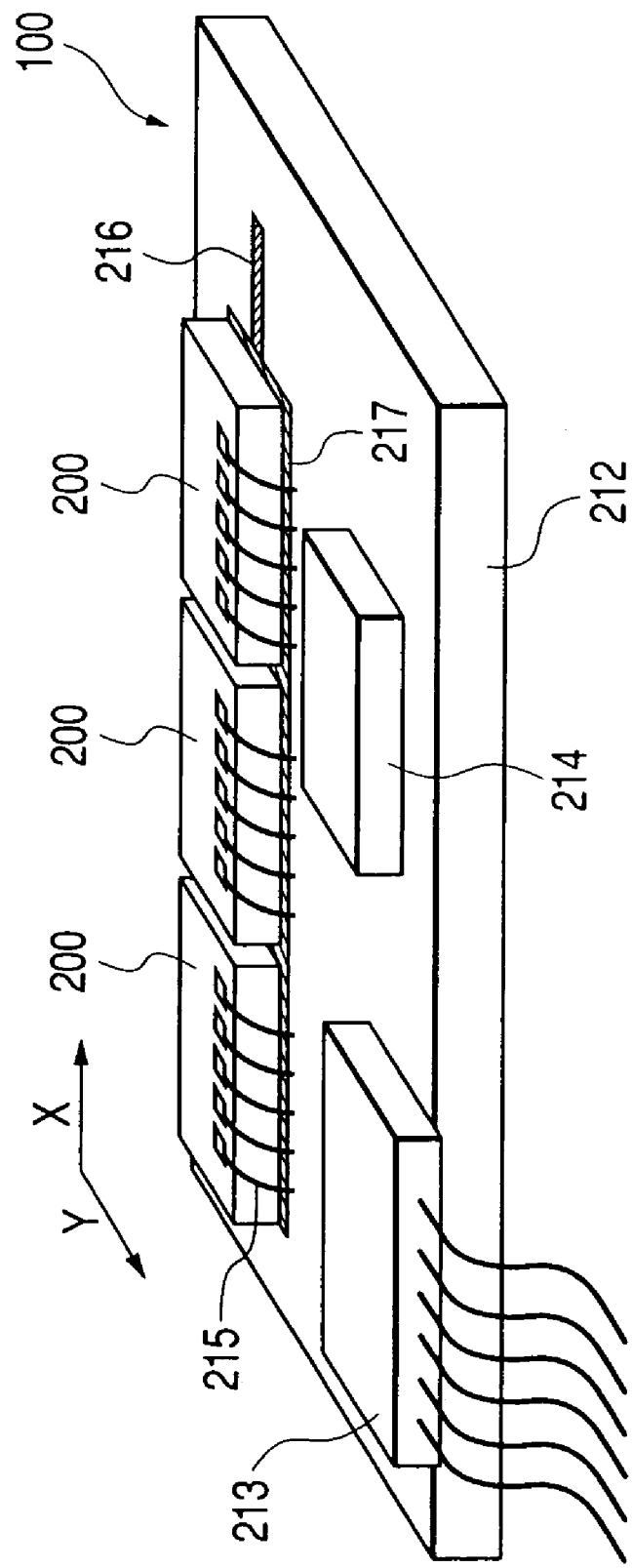
FIG. 6 is a perspective view showing a structure of a recording head.

FIG. 6 shows a structure of an SLED array head 100 which acts as a recording head applicable to the present invention. It should be noted that circuit structure and operation of this head are the same as those shown in FIGS. 13 and 14, whereby the explanation thereof will be omitted.

Figure 13:
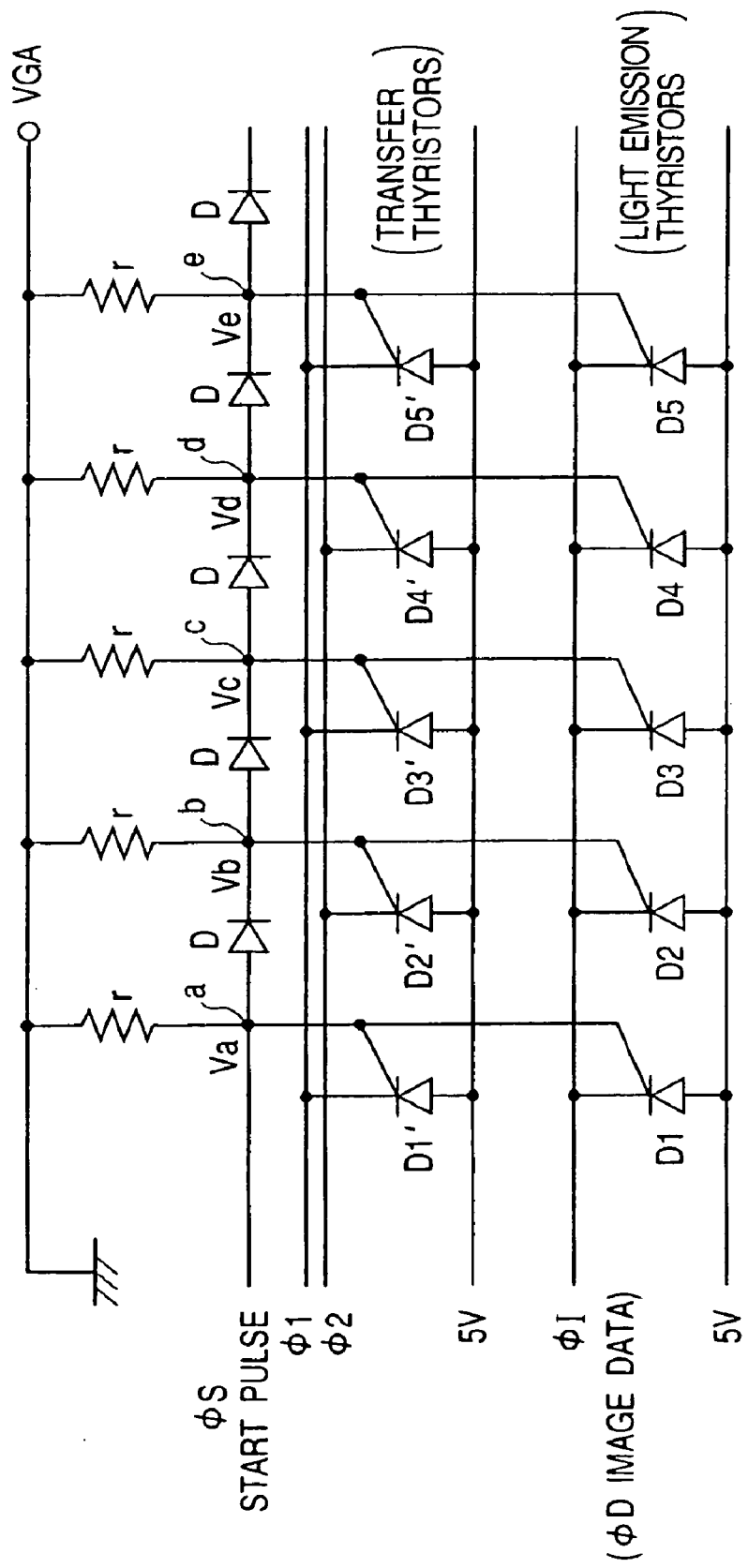
FIG. 13 is a circuit diagram showing a structure of a driving circuit.
Figure 14:
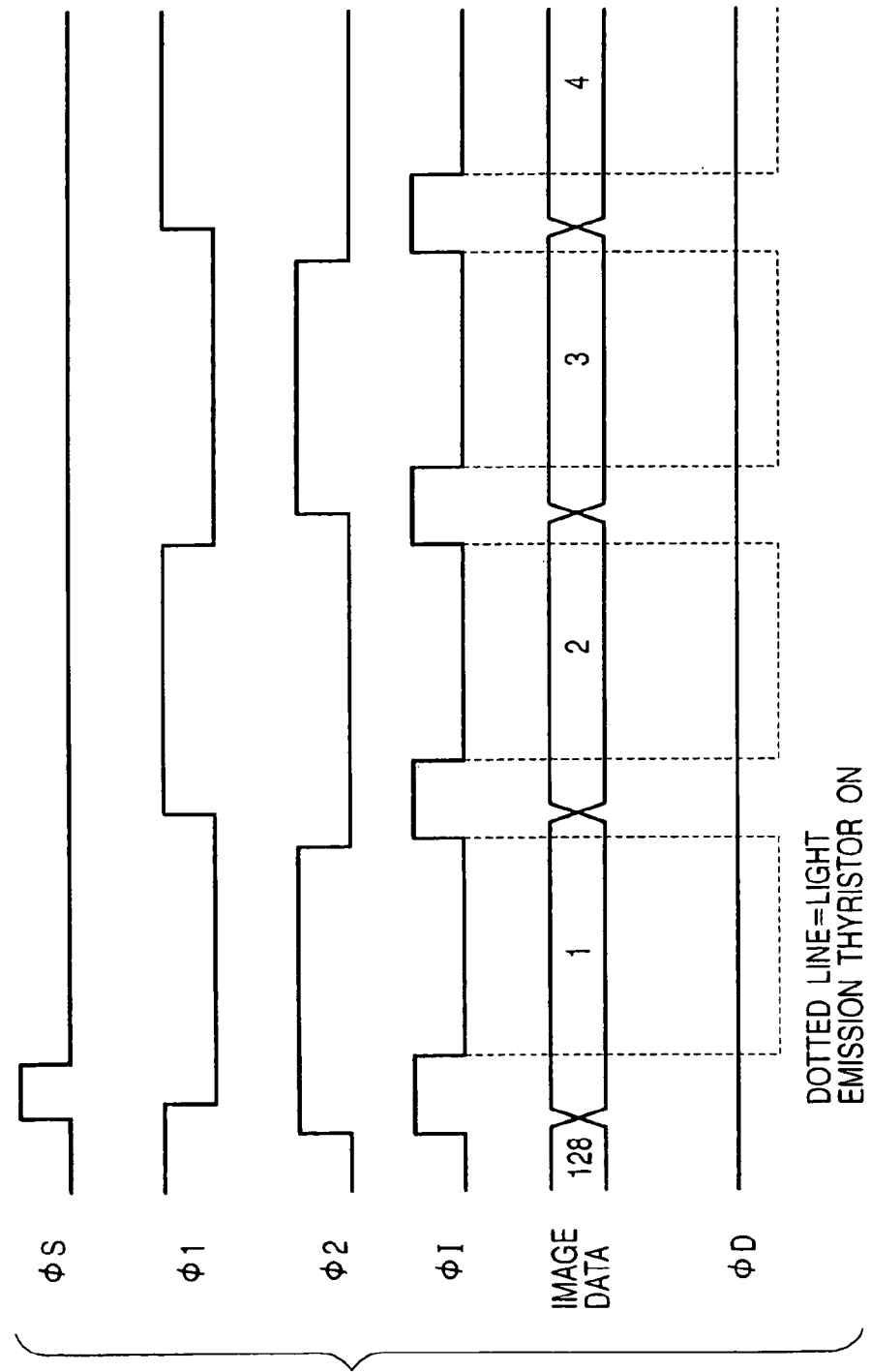
FIG. 14 is a waveform diagram showing various signals input to the driving circuit.
Figure 15:
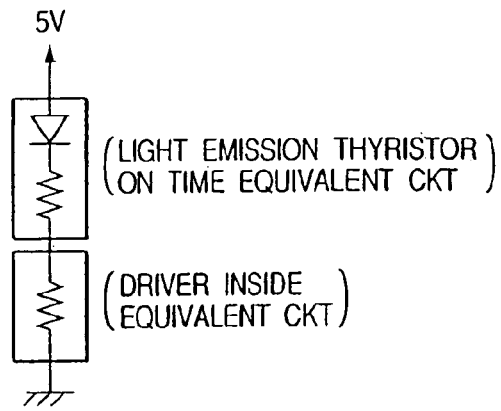
FIG. 15 is a circuit diagram showing an equivalent circuit of a light emission thyristor.
Figure 16:
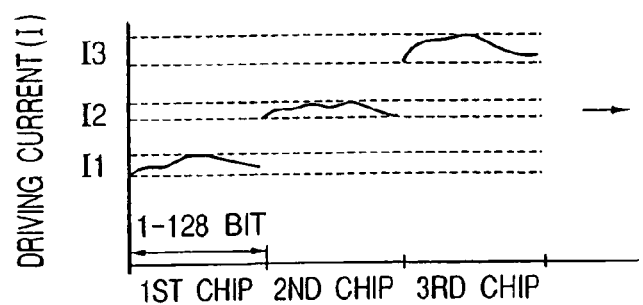
FIG. 16 is a characteristic diagram showing a change of a driving current for a chip.
Figure 17:
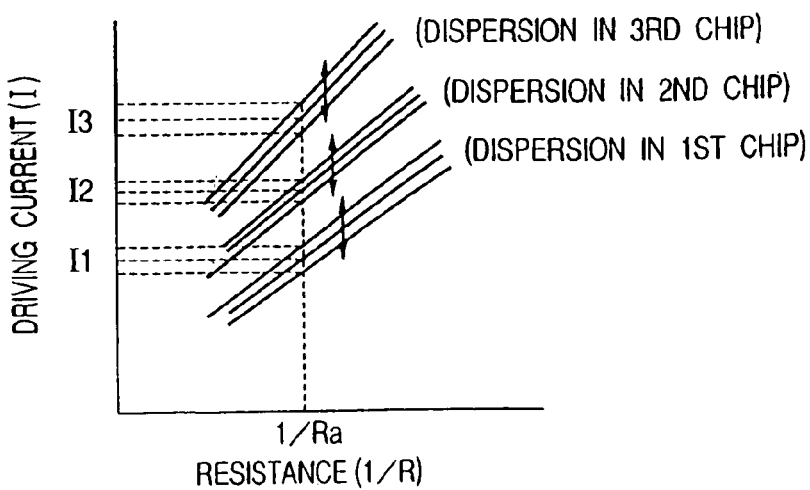
FIG. 17 is a characteristic diagram showing a change of a driving current for a current limitation resistor.
Figure 18:
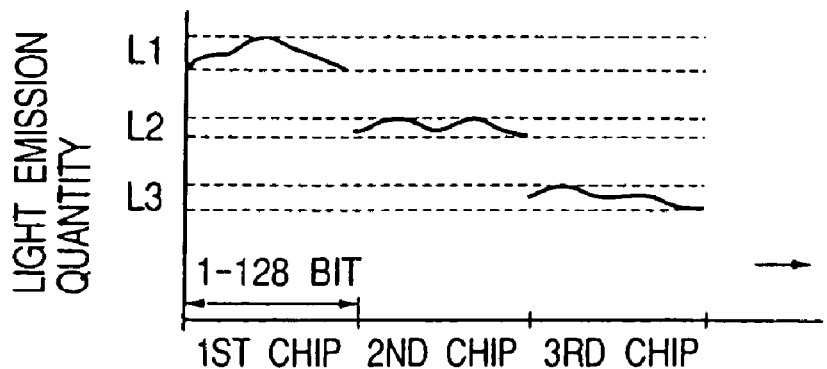
FIG. 18 is a characteristic diagram showing a change of a light emission quantity for the chip.
Figure 19:
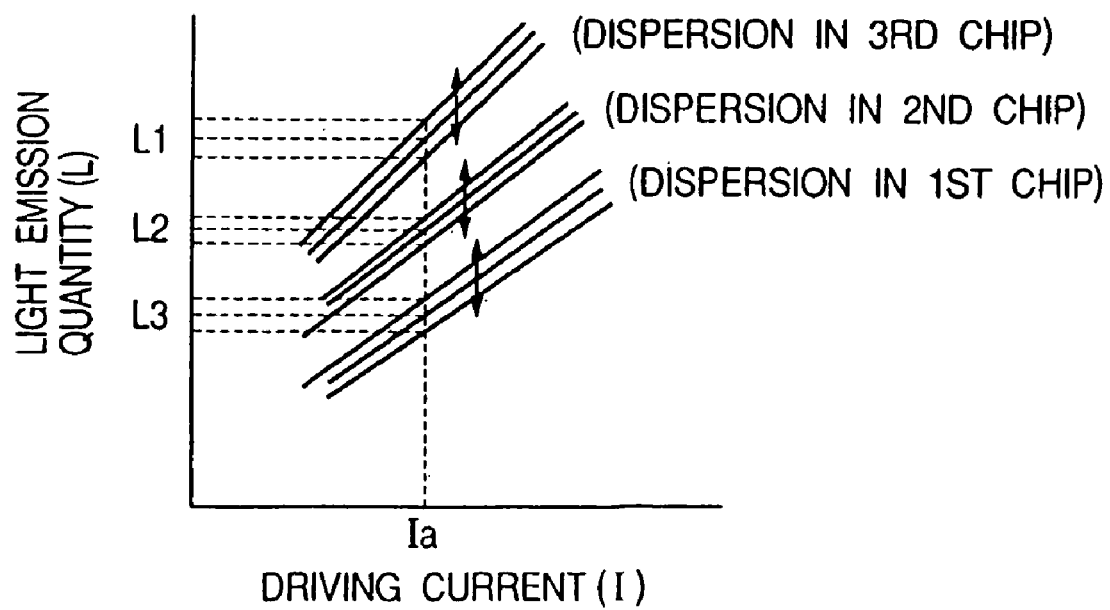
FIG. 19 is a characteristic diagram showing a change of a light emission quantity for a driving current.
Figure 20:
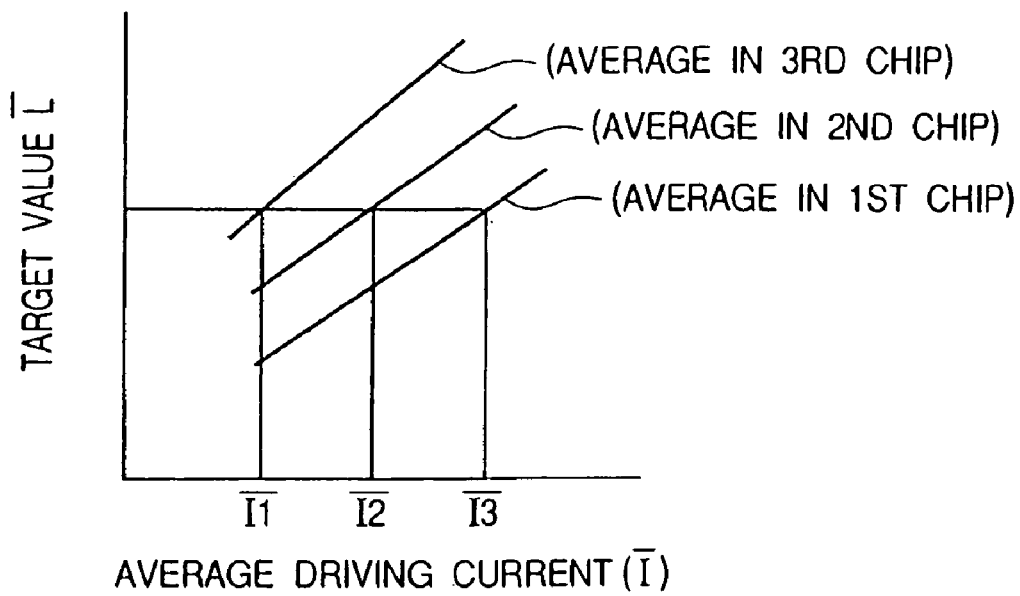
FIG. 20 is a characteristic diagram showing a change of an average light emission quantity for an average driving current.
Figure 21:
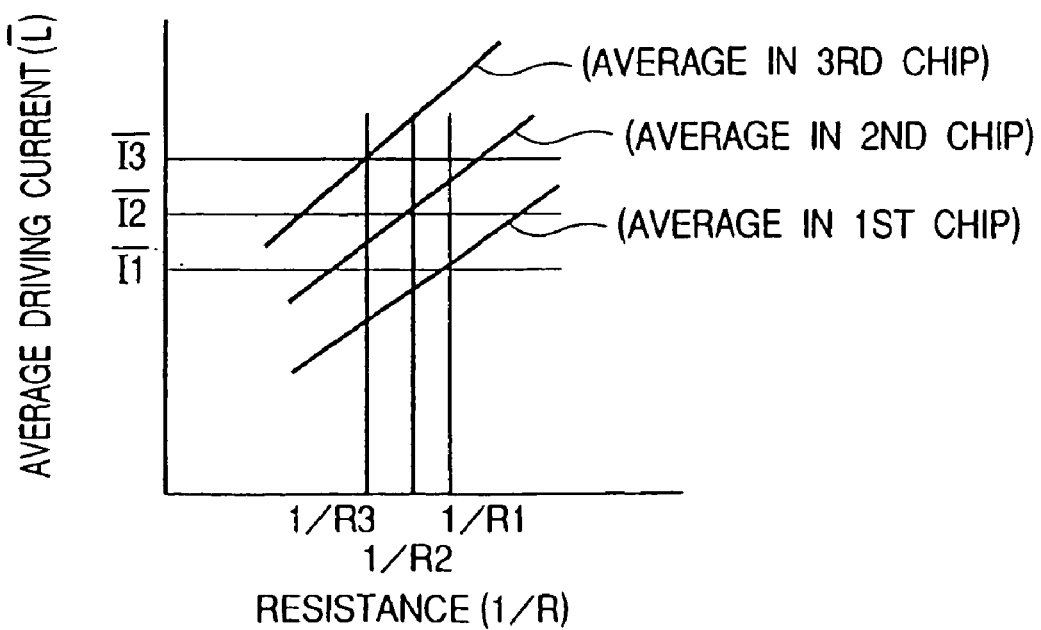
FIG. 21 is a characteristic diagram showing a change of the average driving current for an external resistance.

Numeral 200 denotes an SLED semiconductor chip (hereinafter called an SLED chip). On one SLED chip 200, plural light emission thyristors are linearly formed as shown in FIG. 13. Here, by way of example, the 128 light emission thyristors are formed on the chip.

Numeral 212 denotes a base substrate on which the SLED chip 200 is installed. The base substrate 212 is manufactured from a print wiring board such as a glass epoxy board, a ceramic board or the like. On the base substrate 212, the plural SLED chips 200 are aligned along a main scan direction X. Here, by way of example, the 56 SLED chips 200 are provided on the base substrate 212.

Numeral 213 denotes a connector which receives an external control signal and power from a power supply. Numeral 214 denotes a lighting control circuit (i.e., a driver IC) which receives the external control signal and generates a light control signal for the SLED chip 200. Numeral 215 denotes a bonding wire by which output signals $\phi1$, $\phi2$, $\phi S$ and $\phi I$ from the driver IC 214 and negative-electrode-side power (GND in this case) are respectively connected to the SLED chip 200. Numeral 216 denotes a positive-electrode-side power supply pattern (+5V in this case) which is drawn on the base substrate 212. Numeral 217 denotes a silver paste which gives electrical conductivity between the positive-electrode-side power supply pattern 216 on the base substrate 212 and a back electrode of the SLED chip 211 and firmly adheres them to each other.

Figure 7:
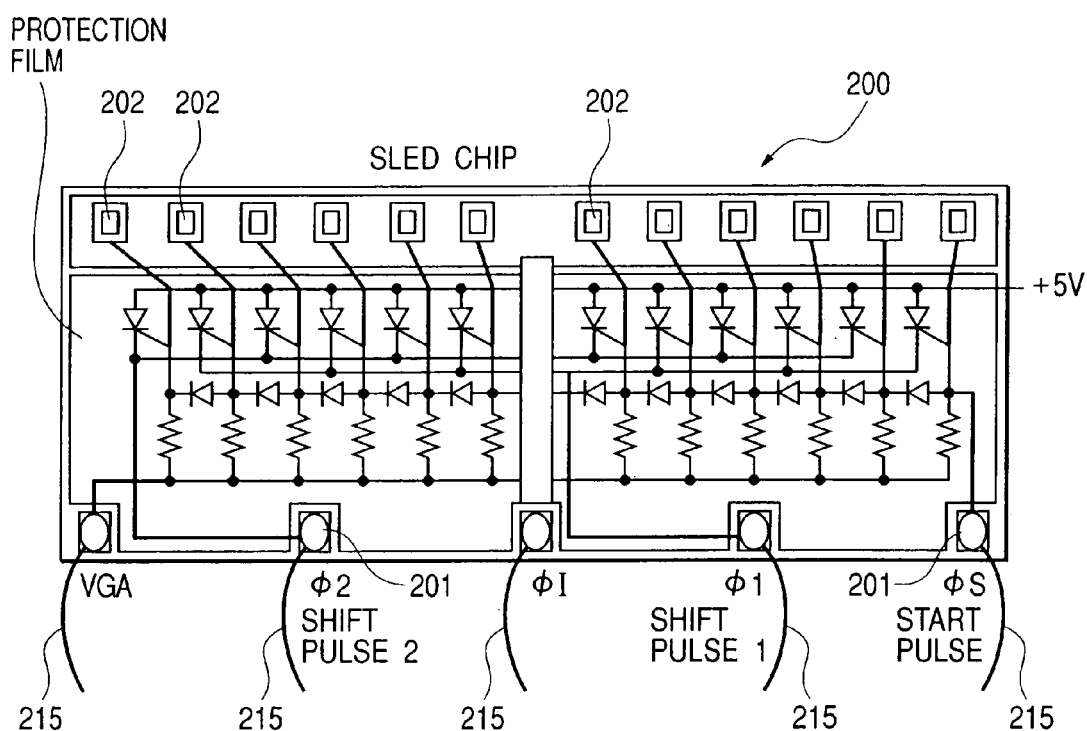
FIG. 7 is a diagram showing an internal structure of an SLED chip.

FIG. 7 is a diagram showing an internal structure of the SLED chip 200.

A bonding pad 201 which is connected to the bonding wire 215 is provided at the input side of the chip end. The signals φ1, φ2, φS, φI and VGA are input through the bonding pad 201. Further, light emission units (i.e., the light emission thyristors in FIG. 13) 202 are provided at the output side of the chip end.

Figure 8:
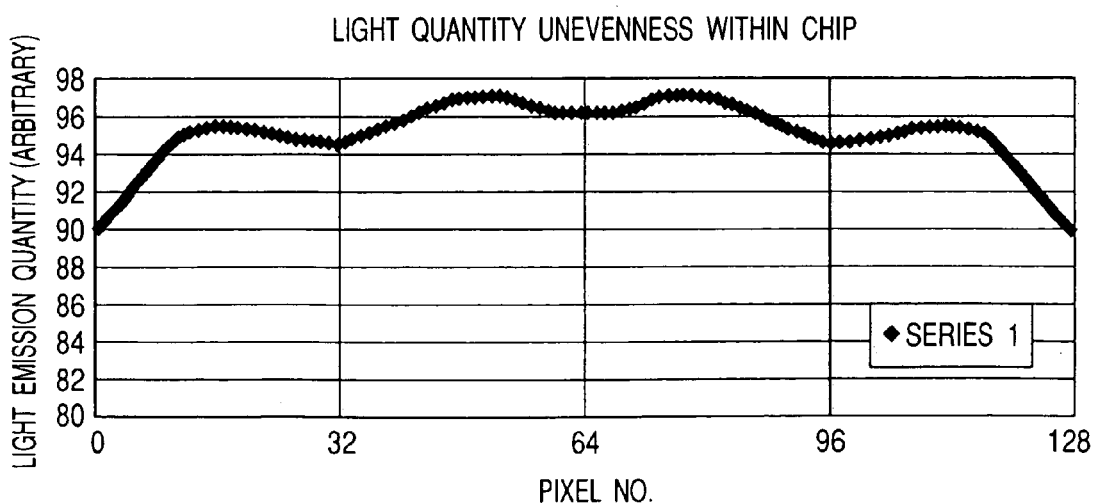
FIG. 8 is a diagram for explaining light quantity unevenness in the chip.

In the SLED array head 100 on which such the SLED chip 200 is installed, common light emission unevenness as shown in FIG. 8 frequently occurs. The reason why a light emission quantity abruptly decreases at the chip end is as follows. Namely, since the heat resistance of the SLED chip 200 abruptly rises while becoming the chip end, light emission efficiency decreases due to such the rise of the heat resistance.

The reason why the light emission quantity gradually decreases from the center of the SLED chip 200 to both the ends thereof is as follows. Namely, as shown in FIG. 7, an impedance of an aluminum wiring pattern being a conductive path of the driving current expands from the bonding pad 201 for inputting the driving signal φI provided at the center of the SLED chip 200 to both the ends thereof.

Further, the reason why the light emission quantity decreases nearby each wire bonding is as follows. Namely, since the area of the aluminum wiring in the portion close to the wire bonding is smaller than that of other portion, more aluminum is etched in this portion at a time of pattern etching. Thus, since an etching rate is relatively lowered, an aluminum wiring width of the light emission portion becomes slightly thick, whereby an aperture area for light emission from the inside of a protection film decreases.

Further, in addition to such light quantity unevenness having the common tendency among the chips, random light quantity unevenness naturally occurs.

Thus, according to the present invention, a means for eliminating the above light quantity unevenness is provided. Namely, pixel correction data for correcting a light emission characteristic of the light emission unit 202 in each chip by the pixel unit is provided for plural lines of image data, a control process is performed to modify a light emission driving time of the light emission unit 202 in each chip by the pixel unit on the basis of a light quantity correction table composed of the pixel correction data of these plural lines.

[Concrete Example]

Hereinafter, the concrete example will be explained.

(System Construction)

An entire construction of a light quantity control system of a recording apparatus according to the present invention will be explained with reference to FIGS. 1 and 2.

Figure 1:
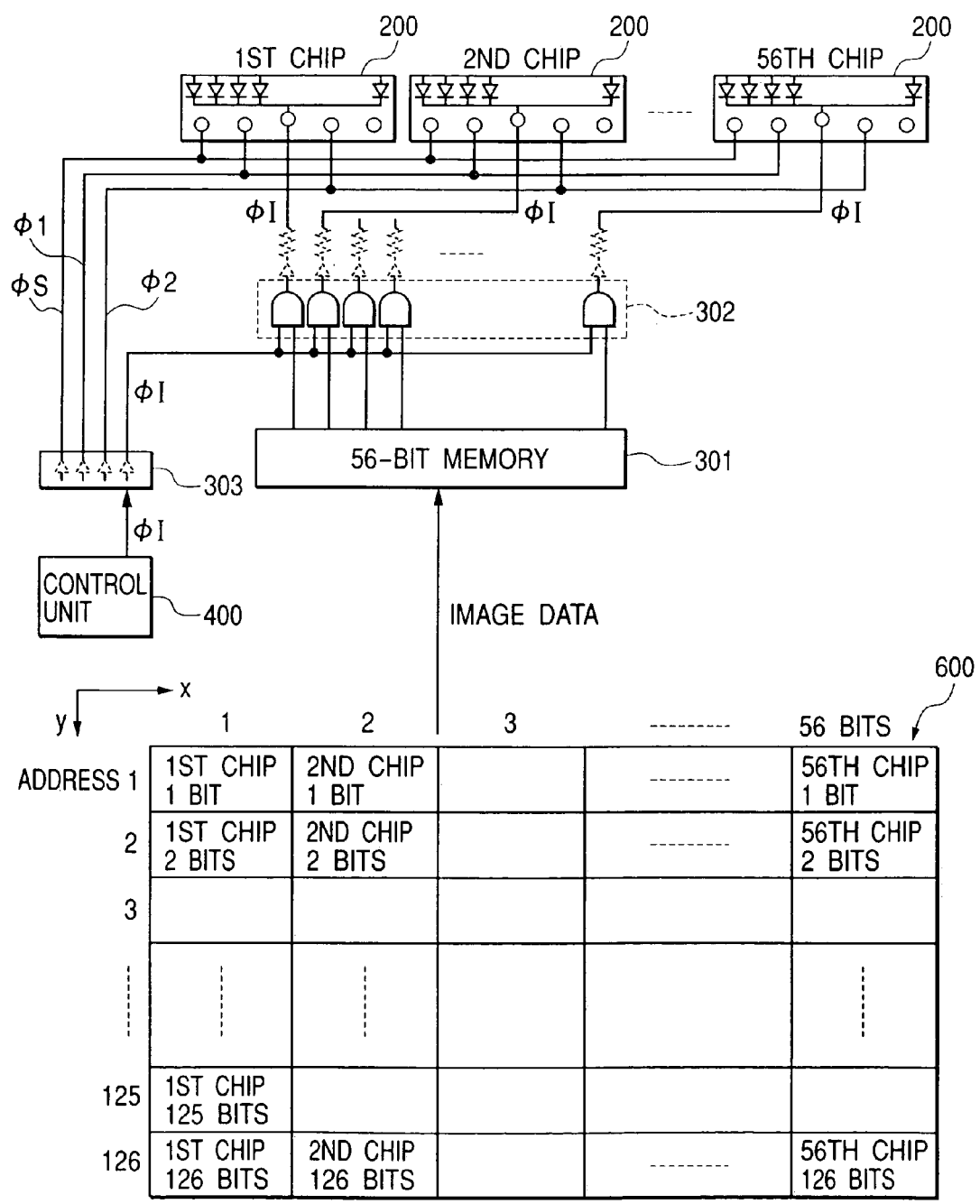
FIG. 1 is a block diagram showing a structure of a light quantity control system of a recording apparatus according to the embodiment of the present invention.

FIG. 1 is a block diagram showing the structure of the light quantity control system. In this example, a control unit 400 which modifies the light emission driving time of the light emission unit 202 by the pixel unit is provided. The light emission control signal φI which is obtained by modifying the light emission driving time is output from the control unit 400.

Figure 22:
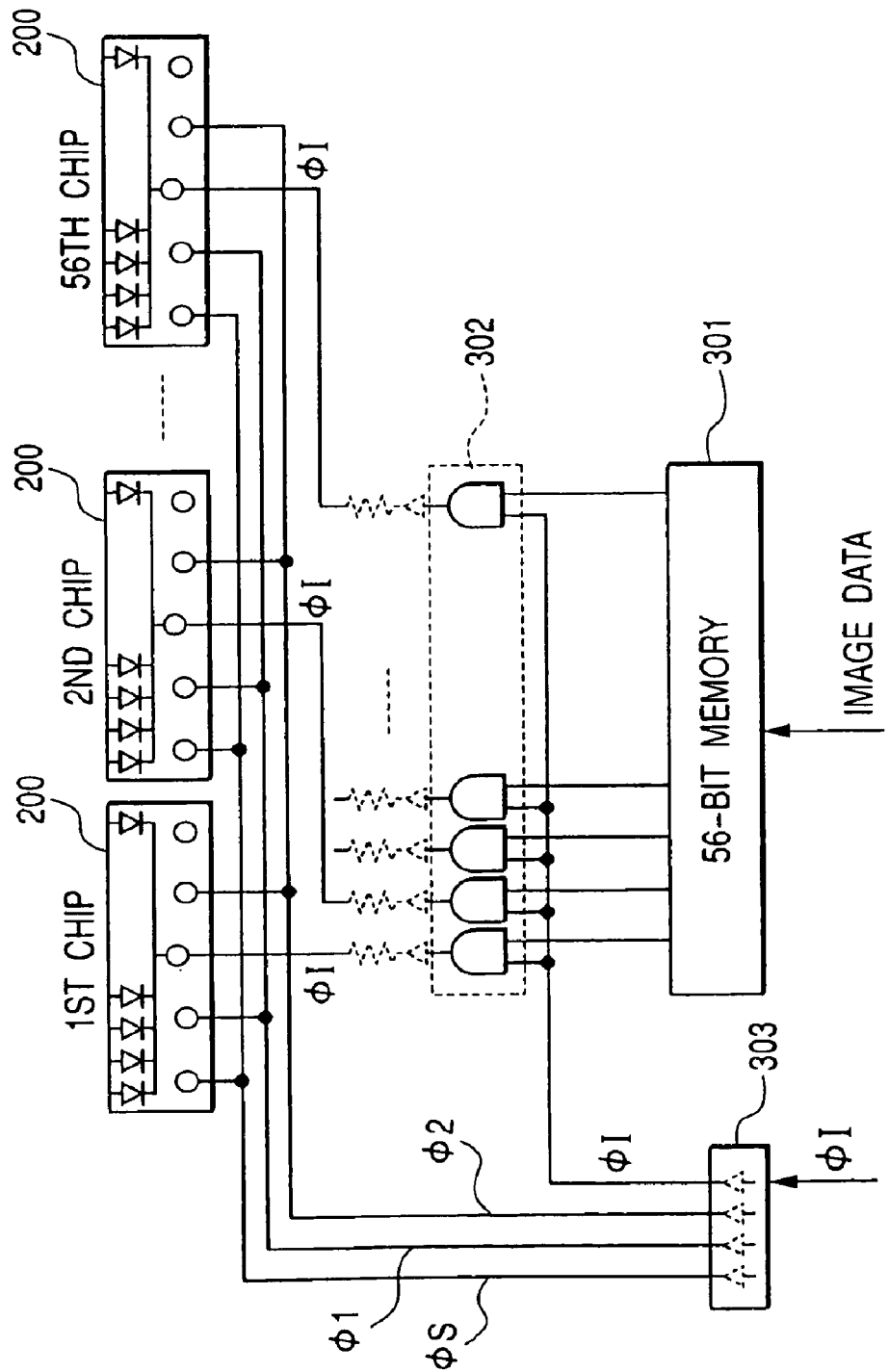
FIG. 22 is a block diagram showing a structure of a light quantity control system of a conventional recording apparatus.

The light emission control signal φI is input to each SLED chip 200 (see FIG. 7) through a connector unit 303 and a gate circuit 302. It should be noted that structures of the gate circuit 302 and a 56-bit memory 301 are the same as those shown in FIG. 22, whereby the explanation thereof will be omitted.

Here, in image data 600, only the data of one line is sequentially input to the 56-bit memory 301.

In the 56-bit memory 301, the total 56 image data 600 composed of one-bit data of the first chip, one-bit data of the second chip, . . . , one-bit data of the 56th chip are stored at an address 1, and the total 56 image data of one line composed of two-bit data of the first chip, two-bit data of the second chip, . . . , two-bit data of the 56th chip are stored at an address 2. Similarly, the image data of one line up to an address 126 are stored.

Figure 2:
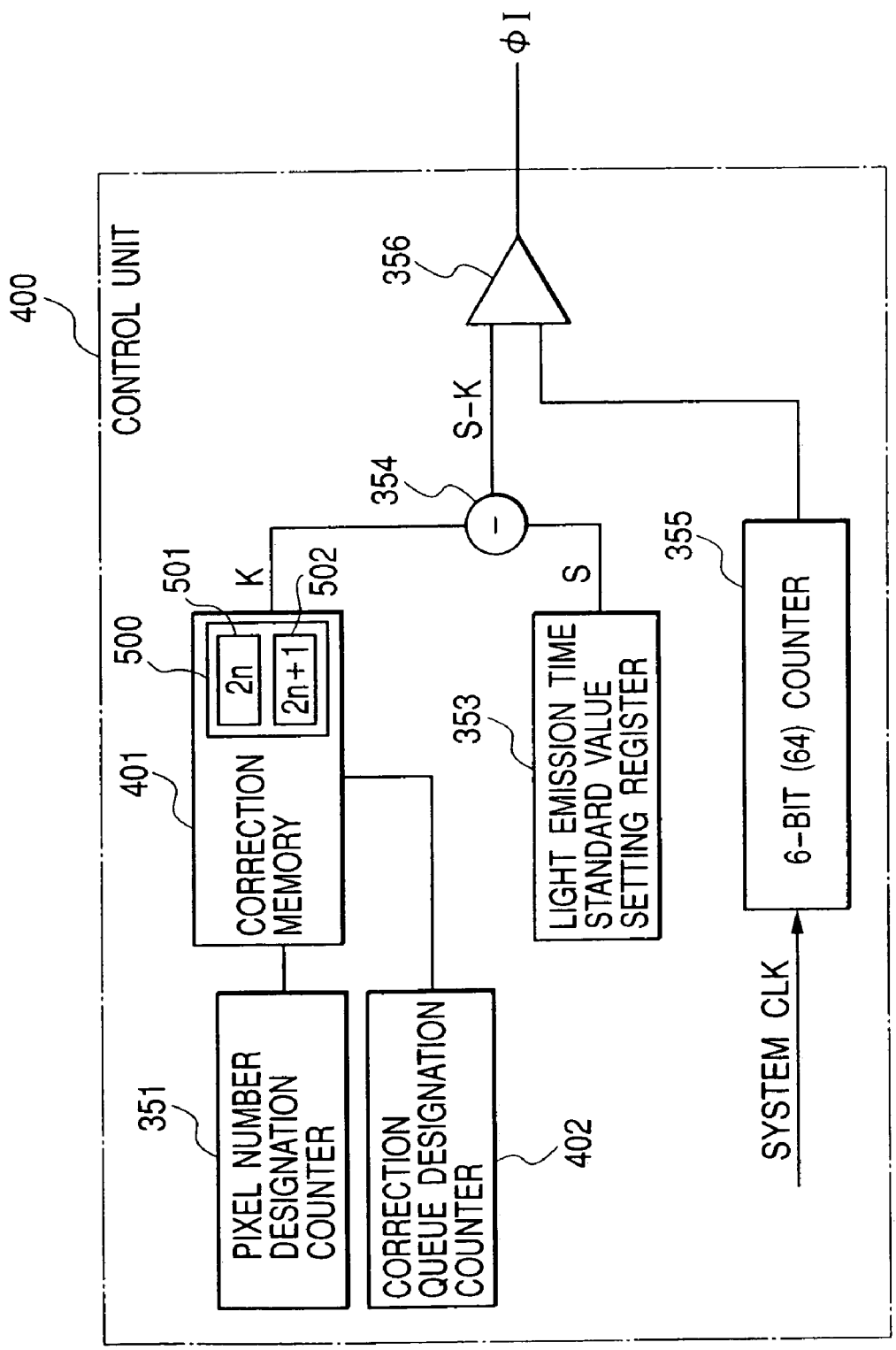
FIG. 2 is a block diagram showing an internal structure of a light quantity control unit.

FIG. 2 shows the structure of the control unit 400 which generates the correction light emission control signal φI for driving and controlling each light emission unit 202.

Numeral 401 denotes a correction memory which stores a light quantity correction table 500 composed of pixel correction data 501 and 502 of the plural lines.

Numeral 402 denotes a correction queue designation counter which designates correction queues (2n, 2n+1) of the pixel correction data 501 and 502 stored in the correction memory 401.

Figure 3:
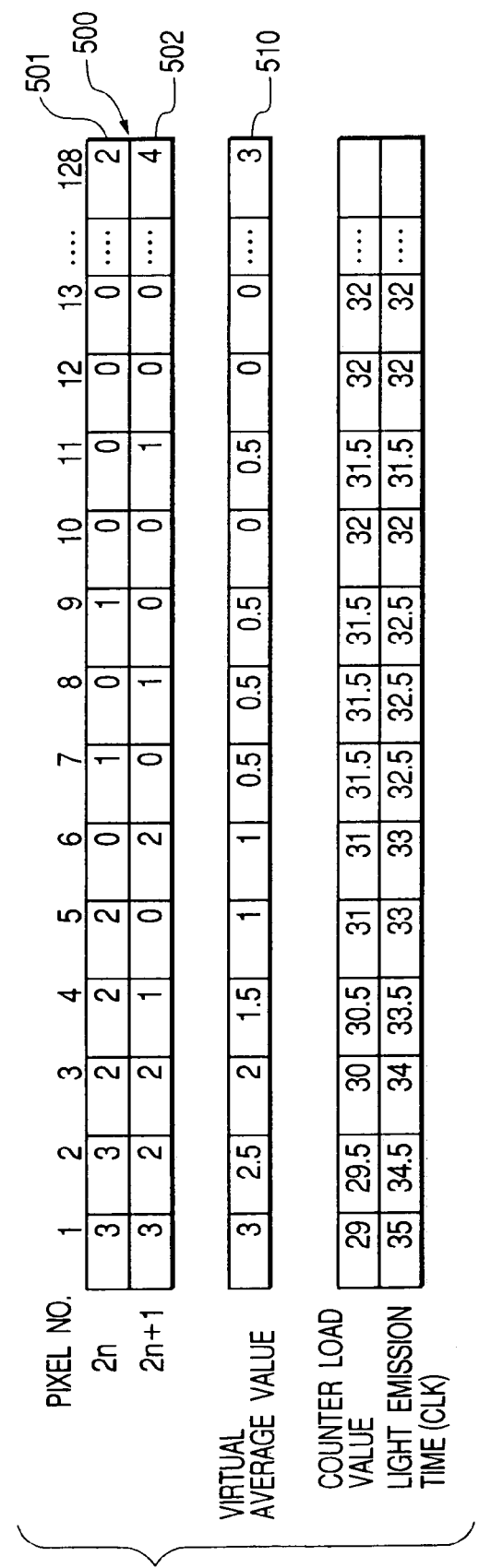
FIG. 3 is a diagram for explaining a structure of correction data.

As shown in FIG. 3, the light quantity correction table 500 is composed of the pixel correction data 501 of 3, 3, 2, 2, 2, 0, . . . , 2 corresponding to the correction queue 2n, and the pixel correction data 502 of 3, 2, 2, 1, 0, 2, . . . , 4 corresponding to the correction queue 2n+1.

Figure 24:
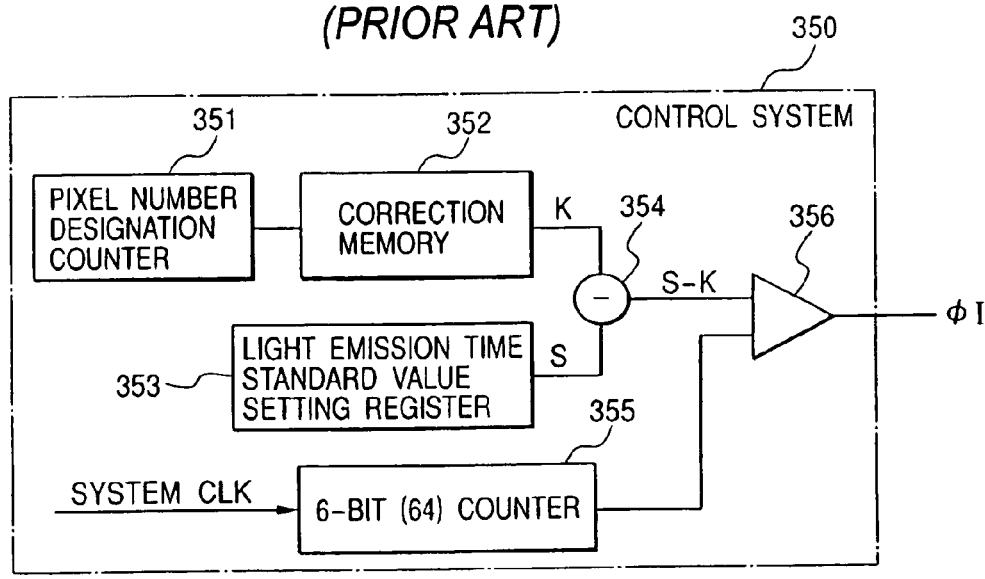
FIG. 24 is a block diagram showing an internal structure of a conventional light quantity control unit.

It should be noted that structures of a pixel number designation counter 351, a light emission time standard value setting register 353, a subtracter 354, a six-bit counter 355 and a comparator 356 are basically the same as those shown in above-described FIG. 24, whereby the explanation thereof will be omitted.

(System Operation)

Hereinafter, the operation of the light quantity control system of the recording apparatus according to the present invention will be explained.

Control of Light Emission Driving Time

First, a process to control the light emission driving time of the light emission control signal φI will be explained with reference to FIG. 2.

In order to fetch the desired pixel correction data from the correction memory 352, the pixel number and the correction queue are output from the pixel number designation counter 351 and the correction queue designation counter 402, respectively. In each scanning line, every time light emission points from 0 to 127 are shifted, the pixel number designation counter 351 counts up the number of shifted light emission points.

Then, a correction value K read from the correction memory 352 is subtracted from a light emission time standard value S being the output value of the light emission time standard value setting register 353 representing the light emission time standard value, on the basis of the pixel number and the correction queue. In a case where the light emission time standard value S is 32, when the correction value K is 3, S−K=32−3=29 is given.

On the other hand, when the light emission point is shifted, the six-bit counter 355 for generating the light emission driving signal counts up the number of shifted light emission points from zero. The six-bit counter 355 receives a basic clock of the control system for an image formation apparatus, from a clock input in an array head or an oscillator (not shown) provided in the array head. Thus, it is logically designed that one-time light emission point shifting is performed while the six-bit counter 355 performs one-cycle counting (64 counting).

Figure 23:
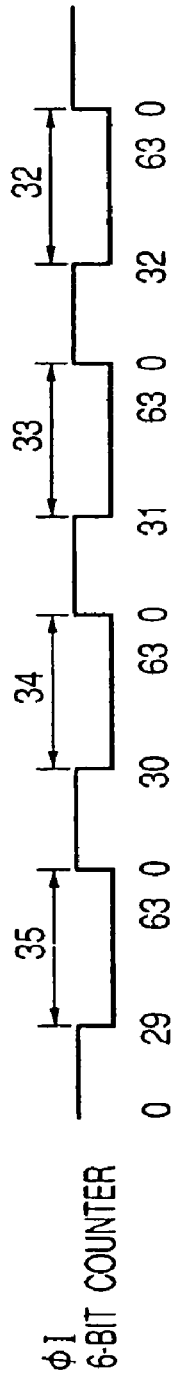
FIGS. 23A and 23B are diagrams for explaining a structure of conventional correction data.

The counted values of the six-bit counter 355 are sequentially compared with counter load values (=the light emission time standard value S−the correction value K) after subtraction by the comparator 356. By such comparison, when the former≧the latter, e.g., only while S−K≧29, the light emission control signal φI has a low level (=L), and the light emission driving as shown in FIG. 23B is performed.

Hereinafter, the light emission time correction for the second and following light emission elements are similarly performed according to the correction value K.

Image Data Correction Process

Next, a process to correct actual image data based on the light emission control signal φI of which light emission driving time has been controlled will be explained with reference to FIGS. 4 and 5.

Figure 4:
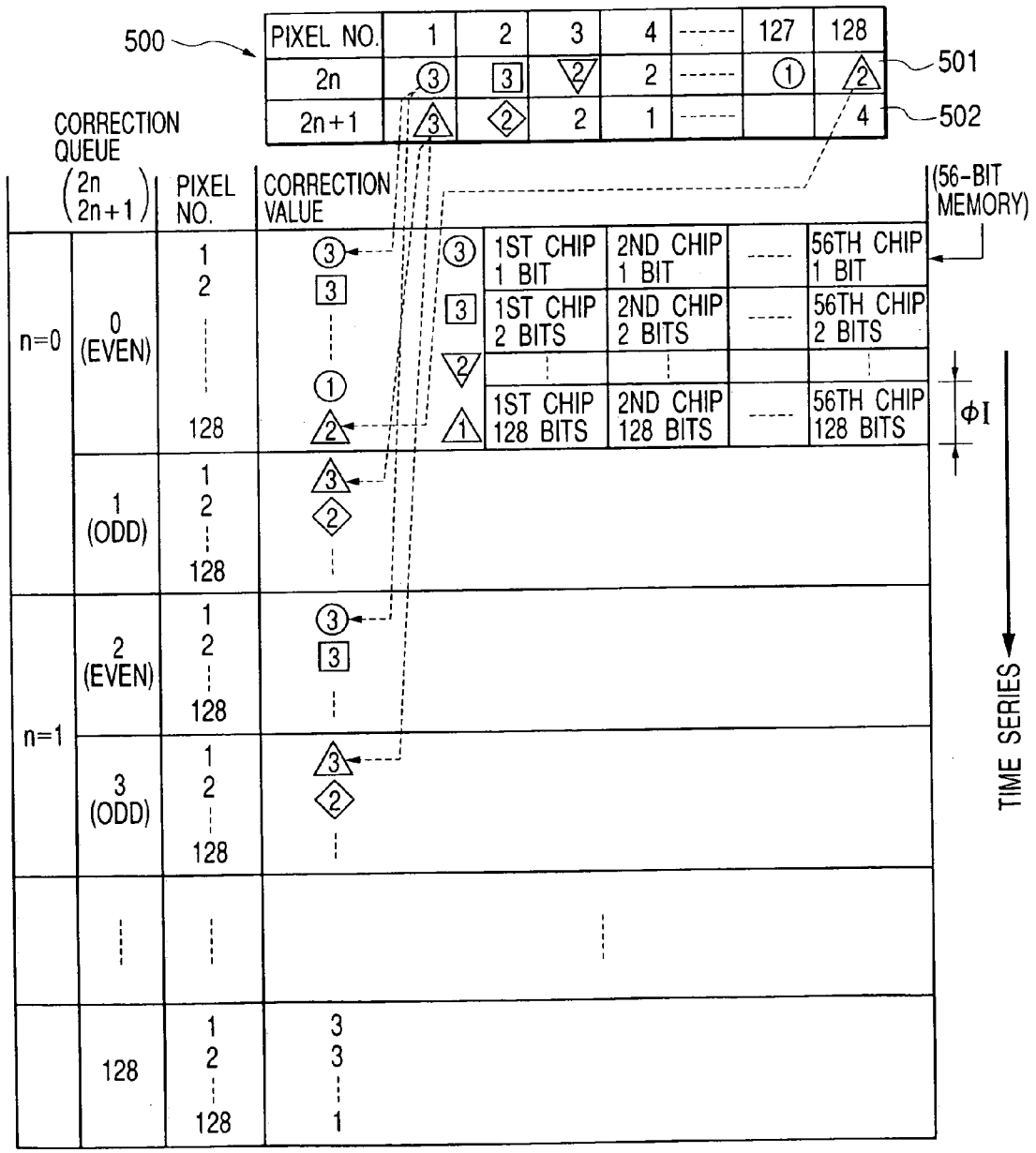
FIG. 4 is a diagram for explaining a light quantity correction process.
Figure 5:
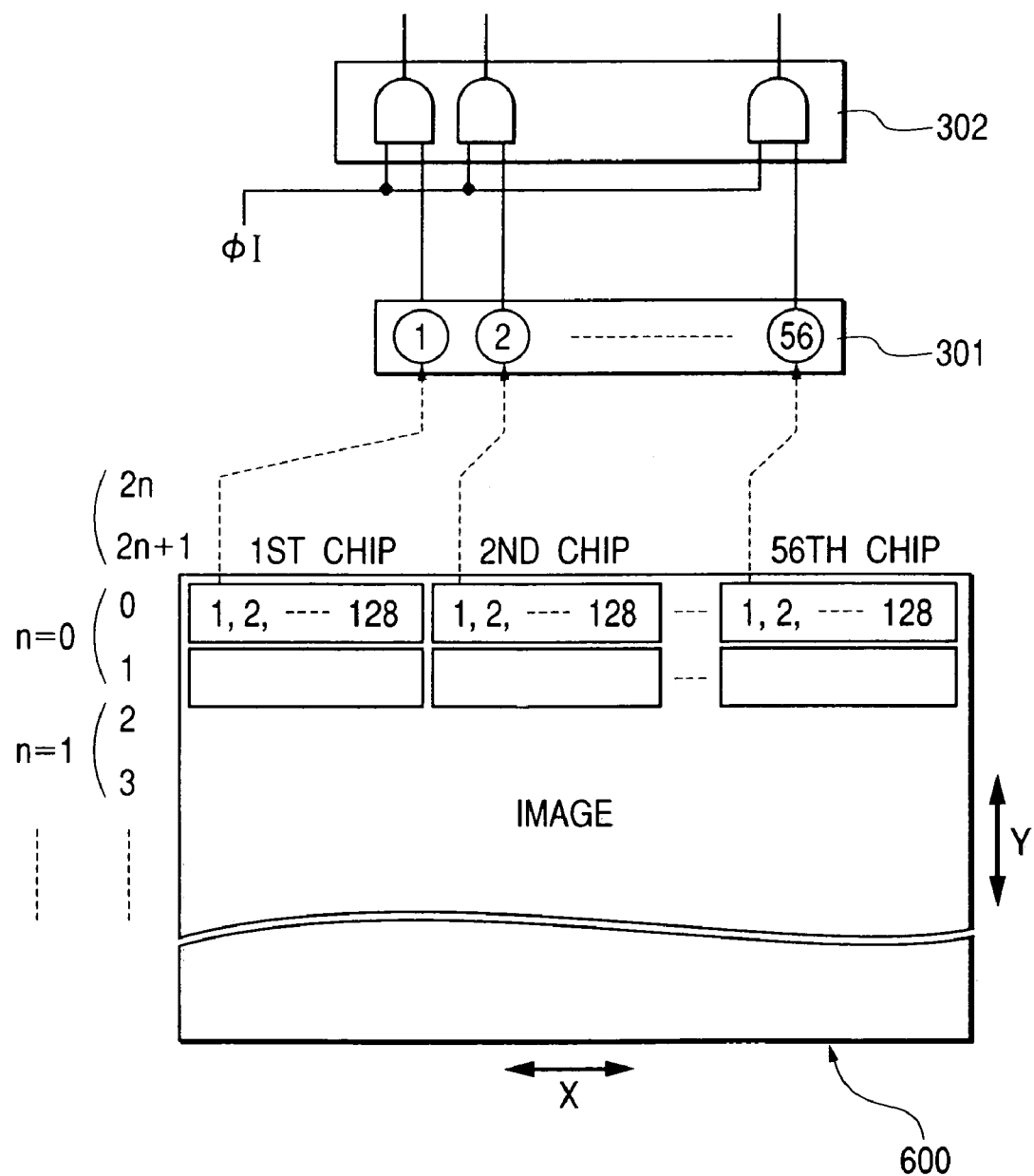
FIG. 5 is a diagram for explaining an image data transfer process.

FIG. 4 is a diagram for explaining the process to fetch the desired pixel correction data 501 and 502 from the correction memory 352, and correct the fetched data to obtain the image data 600.

For example, it is assumed that n=0. At this time, the correction queues are given as 0 (=2n) and 1 (=2n+1). The correction queue 0 corresponds to the even-number lines, and the correction queue 1 corresponds to the odd-number lines.

Thus, in the light quantity correction table 500, it first pays attention to the pixel correction data 501 corresponding to the even-number lines of the image data 600.

Then, the correction value 3 of the first pixel of the correction queue 0 corresponding to the even-number lines is fetched, and the fetched correction value 3 is applied to the first pixel data of one line stored in the 56-bit memory 301. For example, if it is assumed that the data of one line is composed of one-bit data of the first chip, one-bit data of the second chip, . . . , one-bit data of the 56th chip, data correction for all the data of the first pixel is performed by using the correction value 3.

Next, the correction value 3 of the second pixel of the correction queue 0 corresponding to the even-number lines is fetched. Thus, data correction for all the data of the second pixel of one line stored in the 56-bit memory 301, i.e., two-bit data of the first chip, two-bit data of the second chip, . . . , two-bit data of the 56th chip, is performed by using this correction value 3 of the second pixel.

Similar data correction is repeated, and then the correction value 2 of the final 128th pixel of the correction queue 0 corresponding to the even-number lines is fetched. Thus, data correction for all the data of the 128th pixel of one line stored in the 56-bit memory 301, i.e., 128-bit data of the first chip, 128-bit data of the second chip, . . . , 128-bit data of the 56th chip, is performed by using the correction value 2 of the 128th pixel. Thus, the correction of the correction queue 0 corresponding to the even-number lines completely ends.

Next, correction of the correction queue 1 corresponding to the odd-number lines of the image data 600 is similarly performed. Namely, in the light quantity correction table 500, it first pays attention to the pixel correction data 502 corresponding to the odd-number lines of the image data 600.

Then, the correction value 3 of the first pixel of the correction queue 1 corresponding to the odd-number lines is fetched, and correction is performed to all the data of the first pixel of one line stored in the 56-bit memory 301, i.e., one-bit data of the first chip, one-bit data of the second chip, . . . , one-bit data of the 56th chip.

Next, the correction value 2 of the second pixel of the correction queue 1 corresponding to the odd-number lines is fetched, and correction is performed to all the data of the second pixel of one line stored in the 56-bit memory 301, i.e., two-bit data of the first chip, two-bit data of the second chip, . . . , two-bit data of the 56th chip.

Similar data correction is repeated, and then the correction value 4 of the final 128th pixel of the correction queue 0 corresponding to the even-number lines is fetched. Thus, data correction for all the data of the 128th pixel of one line stored in the 56-bit memory 301, i.e., 128-bit data of the first chip, 128-bit data of the second chip, . . . , 128-bit data of the 56th chip, is performed by using the correction value 4 of the 128th pixel. Thus, the correction of the correction queue 1 corresponding to the odd-number lines completely ends.

The above correction process is applied to the example of n=0. However, even if n is incased such as n=1, 2, . . . (but n should correspond to the number of image areas), it is possible to alternately correct the even-number lines and the odd-number lines of the image data 600 as shown in FIG. 5.

Correction Resolution

Next, correction resolution of the light emission driving time of the light emission control signal φI will be explained with reference to FIG. 3.

A virtual average value 510 of FIG. 3 represents an average value of the pixel correction data 501 and 502 of the light quantity correction table 500. This virtual average value 510 is not a value used for the actual correction process but is a value used as a reference in the concept of the correction resolution.

Figure 25:
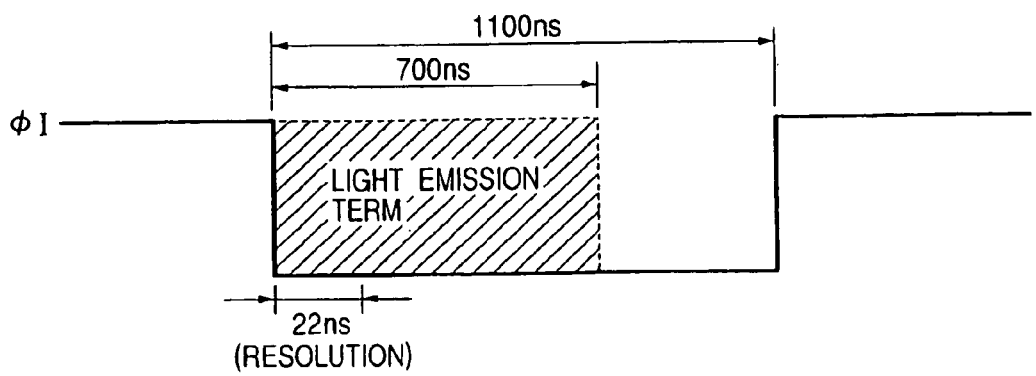
FIG. 25 is a waveform diagram showing a light emission term.

For example, the virtual average value is 3 as the correction value for the first pixel, and the number of light emission time pulses at this time is 35. As shown in FIG. 25, when a system clock resolution is 22 ns, the light emission time is 770 ns (=35×22).

Further, in the second pixel, the virtual average value is 2.5 and the number of light emission time pulses is 34.5, whereby the light emission time is 759 ns (=34.5×22). Therefore, the correction resolution is given by an expression (1).

$$770 \text{ ns} - 759 \text{ ns} = 11 \text{ ns (for 0.5 pulses)} \quad \ldots (1)$$

On the contrary, in the above-described related background art, as shown in FIGS. 23A and 23B, the light emission time in the first pixel is 770 ns (=35 pulses×22), and the light emission time in the second pixel is 748 ns (=34 pulses×22). Therefore, the correction resolution is given by an expression (2).

$$770 \text{ ns} - 748 \text{ ns} = 22 \text{ ns (for 1 pulse)} \quad \ldots (2)$$

As apparent from comparison between the expressions (1) and (2), the correction resolution in the present invention is reduced by half (½) as compared with the resolution in the related background art.

As described above, the correction value of the queue 2n is used for the even-number lines in the plural lines of the image data, the correction value of the queue 2n+1 is used for the odd-number lines, and the correction of the light emission time of each light emission element is repeated for every two lines. Thus, the minimum resolution of the correction value can be substantially considered to be 0.5 clocks when one-clock modulation is performed only once for the two lines, whereby it is possible to perform the more smooth and detailed correction.

In the present embodiment, the example having the two-line correction data was explained. However, by providing with more correction data, it is possible to perform the correction of higher resolution.

It should be noted that the "light quantity" being the standard of the light quantity unevenness shown in FIG. 8 represents the light quantity of each of one to 12 bits. This light quantity can be assumed as an each-bit average value as the entire manufactured chip. In this case, a correction table of a certain pattern is always provided without using the recording head.

Further, the light quantity can be assumed as an each-bit average value in all the chips obtained from one wafer. In this case, it is possible to set an optimum correction table for each recording head manufactured from the chips of a predetermined wafer lot.

Further, the light quantity can be assumed as an each-bit average value in all the chips of each recording head. In this case, it is possible to set an optimum correction table for each recording head.

Experimental Example

Next, an experimental example of the light emission correction for the light emission unevenness will be explained with reference to FIGS. 9, 10 and 11. Here, the experiment example will be explained while comparing it with a conventional example.

FIG. 11 shows a conventional light quantity correction table of the image data 600. In FIG. 11, the bit number corresponds to the pixel number shown in FIG. 8. The light quantity is detected for each bit. The correction value corresponds to the correction value shown in FIGS. 23A and 23B.

One period is assumed to be 64 counts, and a default light emission time is assumed to be 32 counts. Thus, an ideal light emission quantity is linearly calculated according to a ratio of the each-bit light quantity to an entire average light quantity (=95.125) of one to 128 bits, and the calculated value is rounded off to make an integer, thereby determining a actual count value. However, in such a correction method, fundamentally, it can do nothing but decide the correction value for each count for the central value of 32 counts. Thus, fundamentally the correction is possible only at a step ratio of 1/32×n.

Figure 12:
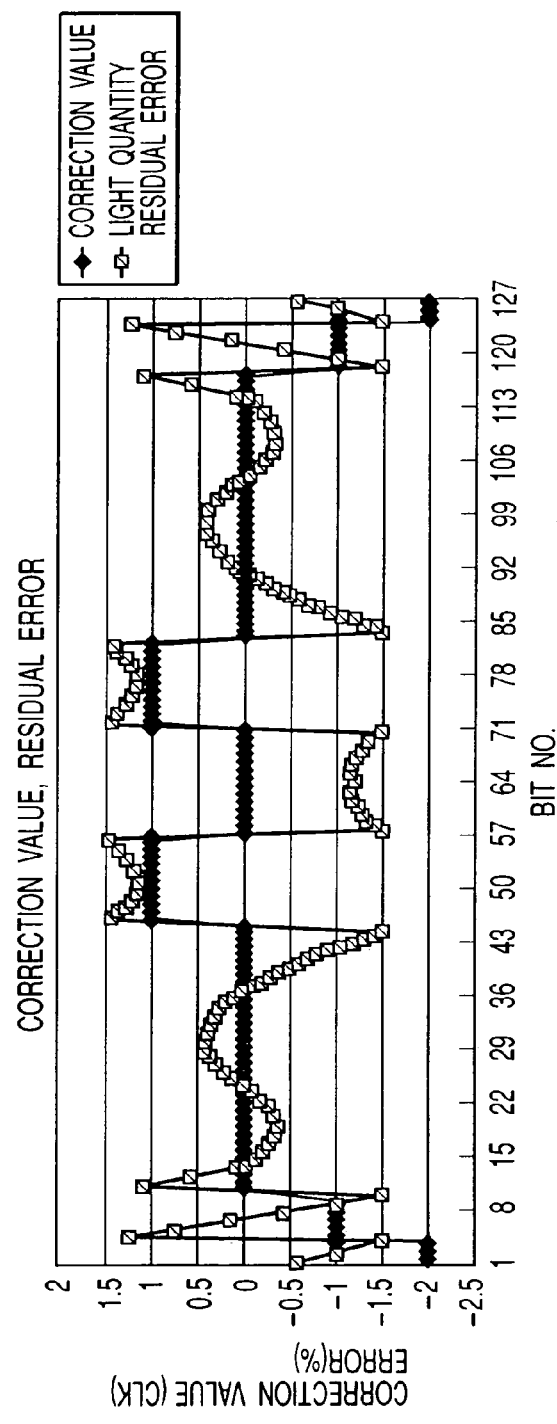
FIG. 12 is a waveform diagram showing graphed correction data of FIG. 11.

FIG. 12 shows that a step variation (a variation quantity=about 3.1%) of one clock occurs in the light quantity of each bit. Thus, an influence such as a stripe or the like occurs in the output image according to the relation between the light quantity variation and the output image.

FIG. 9 shows an example of a correction table 610 according to the present invention in which correction values of two lines are provided in a sub scan direction Y.

In FIG. 9, a period of the light emission control signal $\phi I$ and a default light emission time are the same as those in the related background art. Namely, the former is 64 counts and the latter is 32 counts. Further, the correction value of the queue $2n$ and the correction value of the queue $2n+1$ correspond to the correction values shown in FIG. 3.

Then, the correction table is changed and used for every successive $2n$ and $2n+1$ lines, and the correction is performed averagely to these two lines (even-number and odd-number lines), whereby it is possible to perform the correction actually for each 0.5 clocks.

Figure 10:
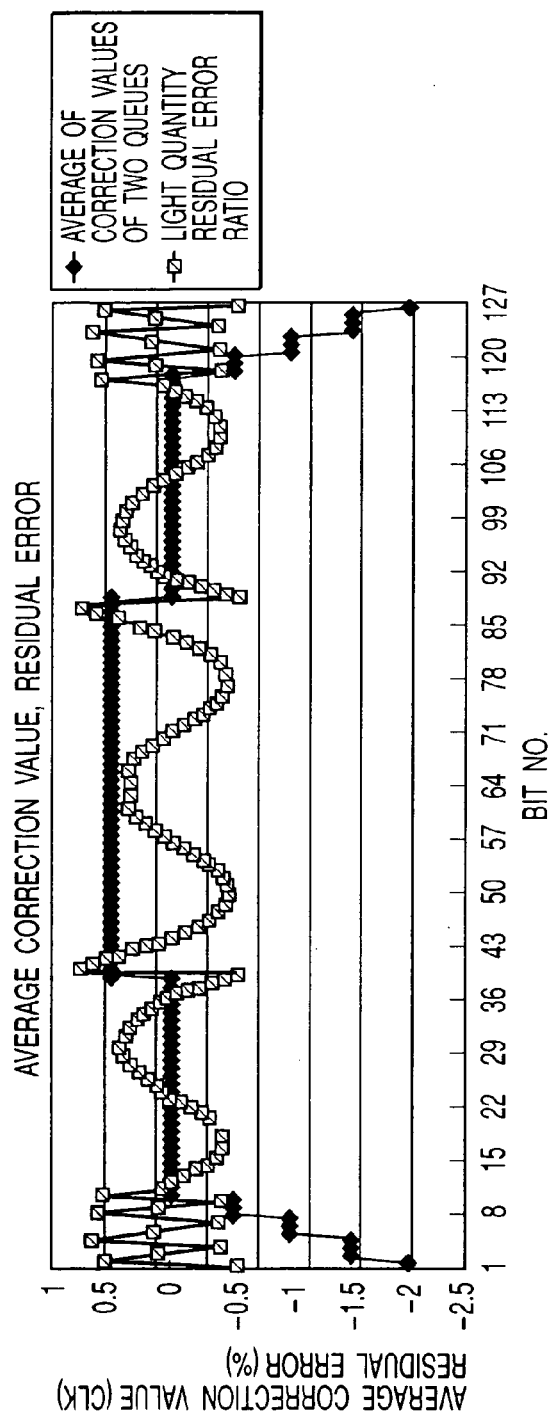
FIG. 10 is a waveform diagram showing graphed correction data of FIG. 9.

FIG. 10 is a graph showing the two-line average value of the correction value and a residual light quantity error (%) after the correction. As compared with the related background art shown in FIG. 12, it can be understood that a variation quantity (1.5%) decreases. Therefore, the conventional influence such as the stripe or the like does not occur.

As explained above, according to the present embodiment, the light quantity correction table in which the pixel correction data for correcting the light emission characteristic of each light emission element of the recording head by the pixel unit is prepared for the plural lines of the image data is first generated. Then, the light emission driving time of each light emission element is modified by the pixel unit on the basis of the light quantity correction table including the pixel correction table of the plural lines. Therefore, the light quantity correction resolution of each light emission element is not limited to the system clock period of the light emission time control circuit, whereby it is possible to perform the light quantity correction at higher resolution. Further, it is possible to decrease or lower discontinuity and incompatible feeling in density appeared at a correction level change point, an excessive correction point and the like, whereby it is possible to form a further smooth and high minute output image.

The control method explained as above is also applicable to a recording chip other than the SLED chip. Further, the above control method is applicable to drive and control another head such as an inkjet recording head, in addition to the recording head of the electrophotographic recording apparatus using the light emission elements.

Further, the present invention is applicable to a system structured by plural devices (e.g., a host computer, an interface device, a reader, a printer, and the like) or to an apparatus structured by one device (e.g., a copying machine, a fax machine, or the like).

Further, it is needless to say that the object of the present invention can be attained in a case where the function of the above embodiment is executed by supplying a program to the system or the apparatus. Further, the object of the present invention can be attained in a case where a storage medium storing a program code of software to execute the function of the above embodiment is supplied to the system or the apparatus, and a computer (or CPU or MPU) in this system or apparatus reads and executes the stored program code.

In this case, the program code itself read from the storage medium executes the function of the above embodiment, whereby the storage medium storing the program code constitutes the present invention.

As the storage medium storing the program code, for example, it is possible to use a floppy disk, a hard disk, an optical disk, a magnetooptical disk, a CD-ROM, a CD-R, a magnetic tape, a non-volatile memory card, various ROM's (a masking ROM, a flash EEPROM, etc.), or the like.

Further, it is needless to say that the present invention includes not only the case where the function of the above embodiment can be executed by performing the program code read by the computer, but also a case where an OS (operating system) or the like running on the computer executes a part or all of the actual process based on an instruction of the program code and the function of the above embodiment can be executed by such the process.

Further, it is needless to say that the present invention includes a case where the program code read from the storage medium is written in a memory provided in a function expansion card inserted in the computer or a function expansion unit connected to the computer, and then based on an instruction of the program code, a CPU or the like provided in the function expansion card or the function expansion unit executes a part or all of the actual process and the function of the above embodiment can be achieved by such the process.

Although the present invention has been explained by using the several preferred embodiments, the present invention is not limited to these embodiments. Namely, it is obvious that various modifications and changes are possible in the present invention without departing from the spirit and scope of the appended claims.

What is claimed is:

1. A recording control apparatus which performs recording on a recording medium by using a recording head, said apparatus comprising:
   said recording head, which includes at least one recording element array in which plural recording elements are aligned along a predetermined direction;
   a driving correction table which includes pixel correction data for correcting a recording driving characteristic of each recording element constituting said recording element array by the pixel unit of image data, and in which the pixel correction data is provided corresponding to plural lines of the image data in a sub-scan direction; and
   driving control means for correcting light emission characteristic dispersion of each recording element by means of an average value of a recording driving time of corresponding recording elements in plural lines of said recording element array, by modifying the recording driving time by the pixel unit, according to switching of the correction data for each line based on said driving correction table including the pixel correction data of the plural lines,
   wherein said driving control means comprises:
      a correction memory for storing said driving correction table including the pixel correction data of the plural lines;
      correction pixel designation means for designating a correction pixel number of the pixel correction data stored in said correction memory:
      correction queue designation means for designating a correction queue of the pixel correction data stored in said correction memory; and
      driving time calculation means for calculating the recording driving time of each recording element of said recording element array by the pixel unit, by using the pixel correction data of each line to which the correction pixel number and the correction queue have been designated.

2. An apparatus according to claim 1, wherein said recording element array includes at least one LED array in which plural LED elements are aligned along said main scan direction.

3. A recording control apparatus which performs electrophotographic recording by using a recording head arranged in a main scan direction perpendicular to a movement direction of a recording medium, said recording control apparatus comprising:
   said recording head, which includes at least one recording element array in which plural recording elements are aligned along said main scan direction;
   a light quantity correction table which includes pixel correction data for correcting a light emission characteristic of each recording element constituting said recording element array by the pixel unit of image data, and in which the pixel correction data is provided corresponding to plural lines of the image data in a sub-scan direction; and
   driving control means for correcting light emission characteristic dispersion of each recording element by means of an average value of a light emission driving time of corresponding recording elements in plural lines of said recording element array, by modifying the light emission driving time by the pixel unit, according to switching of the correction data for each line based on said light quantity correction table including the pixel correction data of the plural lines,
   wherein said driving control means comprises:
      a correction memory for storing said light quantity correction table including the pixel correction data of the plural lines;
      correction pixel designation means for designating a correction pixel number of the pixel correction data stored in said correction memory;
      correction queue designation means for designating a correction queue of the pixel correction data stored in said correction memory; and
      driving time calculation means for calculating the light emission driving time of each recording element of said recording element array by the pixel unit, by using the pixel correction data of each line to which the correction pixel number and the correction queue have been designated.

4. A recording control method which performs recording on a recording medium by using a recording head, the recording head including at least one recording element array in which plural recording elements are aligned along a predetermined direction, said method comprising:
   a step of generating a driving correction table which includes pixel correction data for correcting a recording driving characteristic of each recording element constituting the recording element array by the pixel unit of image data, and in which the pixel correction data is provided corresponding to plural lines of the image data in a sub-scan direction; and
   a driving control step for correcting light emission characteristic dispersion of each recording element by means of an average value of a recording driving time of corresponding recording elements in plural lines of the recording element array, by modifying the recording driving time by the pixel unit, according to switching of the correction data for each line based on the driving correction table including the pixel correction data of the plural lines,
   wherein said driving control step comprises:
      a storage step, of storing the driving correction table including the pixel correction data of the plural lines in a correction memory;
      a correction pixel designation step, of designating a correction pixel number of the pixel correction data stored in the correction memory;
      a correction queue designation step, of designating a correction queue of the pixel correction data stored in the correction memory; and
      a driving time calculation step, of calculating the recording driving time of each recording element of the recording element array by the pixel unit, on the basis of the pixel correction data of each line to which the correction pixel number and the correction queue have been designated.

5. A recording control method which performs electrophotographic recording on a recording medium moving in a direction perpendicular to a main scan direction, by using a recording head which includes at least one recording element array in which plural recording elements are aligned along the main scan direction, said recording control method comprising:

a step of generating a light quantity correction table which includes pixel correction data for correcting a light emission characteristic of each recording element constituting the recording element array by the pixel unit of image data, and in which the pixel correction data is provided corresponding to plural lines of the image data in a sub-scan direction; and a driving control step for correcting light emission characteristic dispersion of each recording element by means of an average value of a light emission driving time of corresponding recording elements in plural lines of said recording element array, by modifying the light emission driving time by the pixel unit, according to switching of the correction data for each line based on the light quantity correction table including the pixel correction data of the plural lines, wherein said driving control step comprises:

a storage step, of storing the light quantity correction table including the pixel correction data of the plural lines in a correction memory;

a correction pixel designation step, of designating a correction pixel number of the pixel correction data stored in the correction memory;

a correction queue designation step, of designating a correction queue of the pixel correction data stored in the correction memory; and a driving time calculation step, of calculating the light emission driving time of each recording element of the recording element array by the pixel unit, on the basis of the pixel correction data of each line to which the correction pixel number and the correction queue have been designated.

6. A method according to claim 5, wherein the recording element array includes at least one LED array in which plural LED elements are aligned along the main scan direction.

* * * * *

UNITED STATES PATENT AND TRADEMARK OFFICE
CERTIFICATE OF CORRECTION

| | |
|---|---|
| PATENT NO. | : 6,972,784 B1 |
| DATED | : December 6, 2005 |
| INVENTOR(S) | : Toshiyuki Sekiya et al. |

It is certified that error appears in the above-identified patent and that said Letters Patent is hereby corrected as shown below:

<u>Column 15,</u>
Line 36, "memory:" should read -- memory; --.

Signed and Sealed this

Twenty-third Day of May, 2006

JON W. DUDAS
*Director of the United States Patent and Trademark Office*